INVENTOR
DUANE W. TYLER

Feb. 2, 1971   D. W. TYLER   3,559,299
GRAIN DRYER AND METHOD OF DRYING GRAIN
Filed Feb. 28, 1969   5 Sheets-Sheet 3

INVENTOR
DUANE W. TYLER
BY

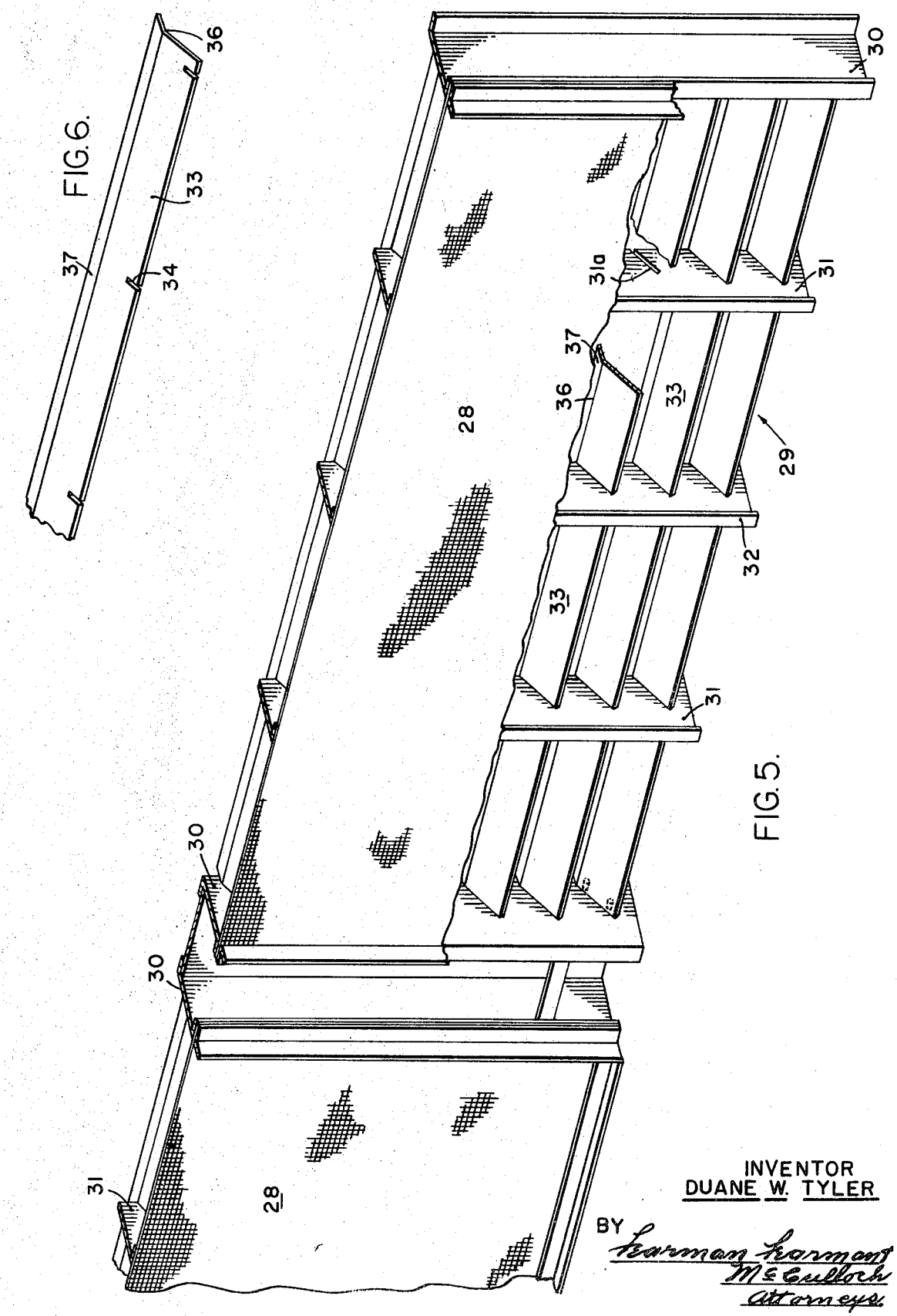

INVENTOR
DUANE W. TYLER

United States Patent Office 3,559,299
Patented Feb. 2, 1971

3,559,299
GRAIN DRYER AND METHOD OF
DRYING GRAIN
Duane W. Tyler, Danville, Ill., assignor to J. P. Burroughs & Son, Inc., Saginaw, Mich., a corporation of Michigan
Filed Feb. 28, 1969, Ser. No. 803,367
Int. Cl. F26b 7/00
U.S. Cl. 34—19                                                26 Claims

ABSTRACT OF THE DISCLOSURE

A filtering method and apparatus for grain dryers for continuously filtering exhaust air after it has been used to dry grain. The air is filtered by passing through a column through which filtering media passes. Means are provided to selectively move the filter media relative to the air stream.

---

This invention relates to a continuous rack-type grain or seed dryer including an air filtering column with a vapor duct adjacent thereto, and means for exhausting filtered air from the vapor duct of the dryer to atmosphere. More particularly, this invention relates to means for filtering the exhausted air.

Dryers are conventionally employed to lower the moisture content of certain grains, corn, and other produce.

It is a prime object of the invention to provide means to prevent the pollution of the adjacent atmosphere during the operation of a grain dryer.

A further object still is to provide an assembly consisting of inlet sections, louvers, screens and discharge sections which are attached to the air discharge of the grain and seed dryer, and over and through which a collecting media is permitted to flow to entrain dust, dirt particles, bee's wings and broken particles of grain and seed which is blown into the media the full height of the vapor duct of the dryer by the discharging air, so that the dryer exhausts filtered air.

In the practice of the present invention, the collecting media is fed into the top of a filtering column and is discharged continually and intermittently as the dryer is operating, and this intermittent discharge is controlled by means of an electrically timed, motorized discharge valve. The media can later be readily cleaned with an aspirator separator when necessary to remove all particles of foreign material and permit recycling of the media back into the filtering column, if desired, by use of a conventional bucket elevator or the like.

Briefly, in accordance with the present invention, there is provided a grain dryer and method of drying grain by means of an air stream which is passed through a drying tower through which the grain to be dried is also passed. Impurities, such as fines from the grain which are entrained in the air stream, are removed by a filter media. If desired, the filter media may comprise a column of grain of the type being dried. The filter media is permitted to flow, accumulating the impurities which may be later removed.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion and minor details of construction, without departing from the spirit, or sacrificing any of the advantages of the invention.

In the drawings:

FIG. 5 is a perspective elevational view, showing the louver arrangement and construction.

FIG. 6 is a detail perspective view showing one of the slitted louvers.

Figure 1:
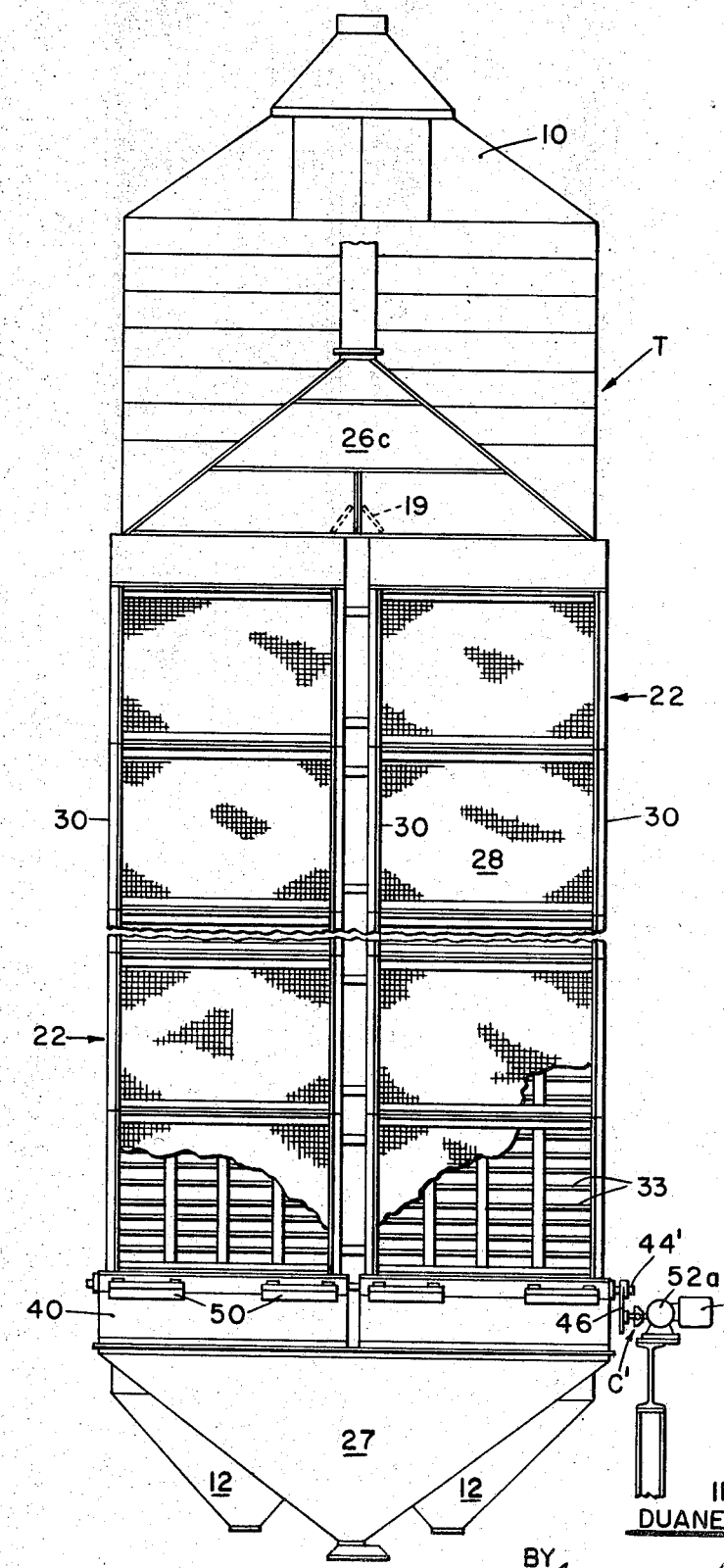
FIG. 1 is a front elevational view of the grain dryer, parts being broken away to more clearly shown the construction.
Figure 2:
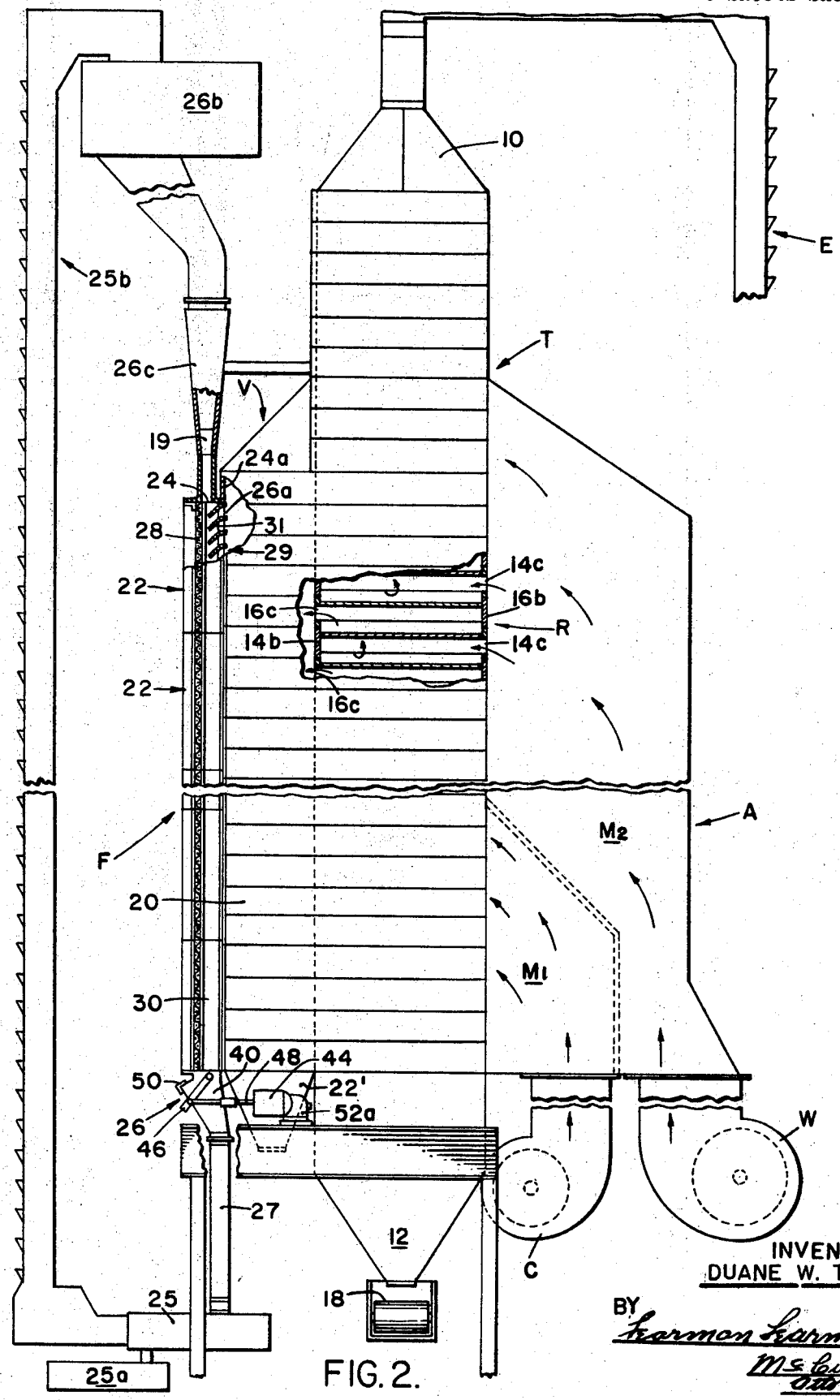
FIG. 2 is a vertical, partly sectional, side elevational view thereof, the arrows indicating the path of travel of the air.

Referring now to FIGS. 1 and 2 of the drawing, first of all a rack-type grain dryer is shown as having a grain drying tower generally designated T through which grain to be dried passes, a source of drying air shown generally at A attached to one side of the tower T, a vapor duct shown generally at V mounted on the opposite side of the tower T, and a filter shown generally at F for removing impurities from the grain in tower T which become entrained in the air stream.

The source of air A may conveniently comprise a source W of warm air which passes to the upper portion of drying tower T, and a source C of cool air which passes to the lower portion of tower T. Source A may be a fan blowing heated air, and source C a blower circulating air at ambient temperature. The air from sources C and W may be separately passed to tower T through any convenient manifolding $M_1$ and $M_2$, as shown.

Mounted at the top of tower T is a garner bin 10 to which grain to be dried is delivered. The grain from bin 10 is gravity-fed past air directing baffles or racks, shown generally at R in FIG. 2, to a discharge hopper 12, formed at the bottom of tower T.

Figure 3:
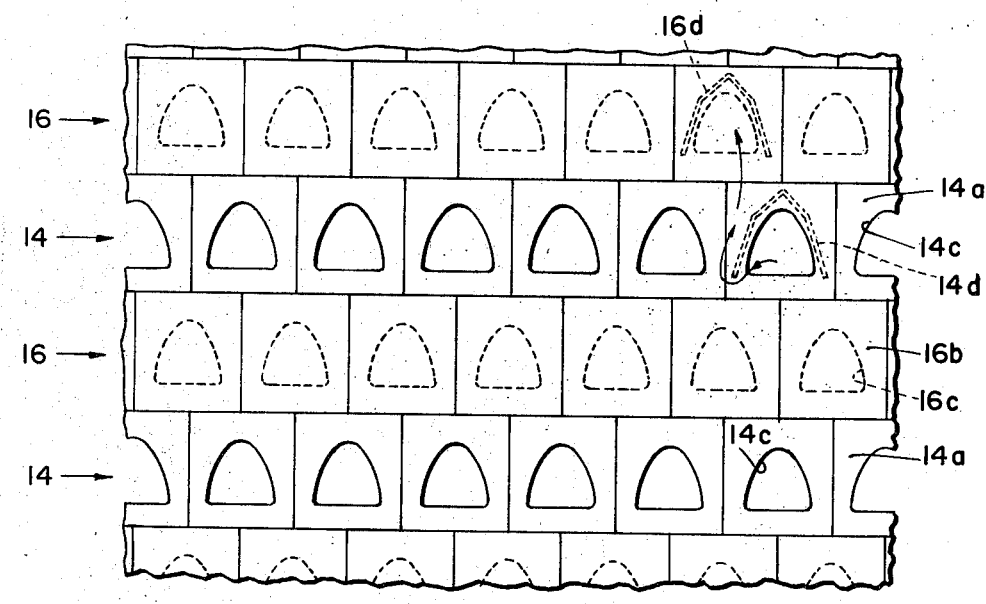
FIG. 3 is a fragmentary, front elevational view of the exhaust racks comprising the drying tower through which the grain to be dried passes.
Figure 4:
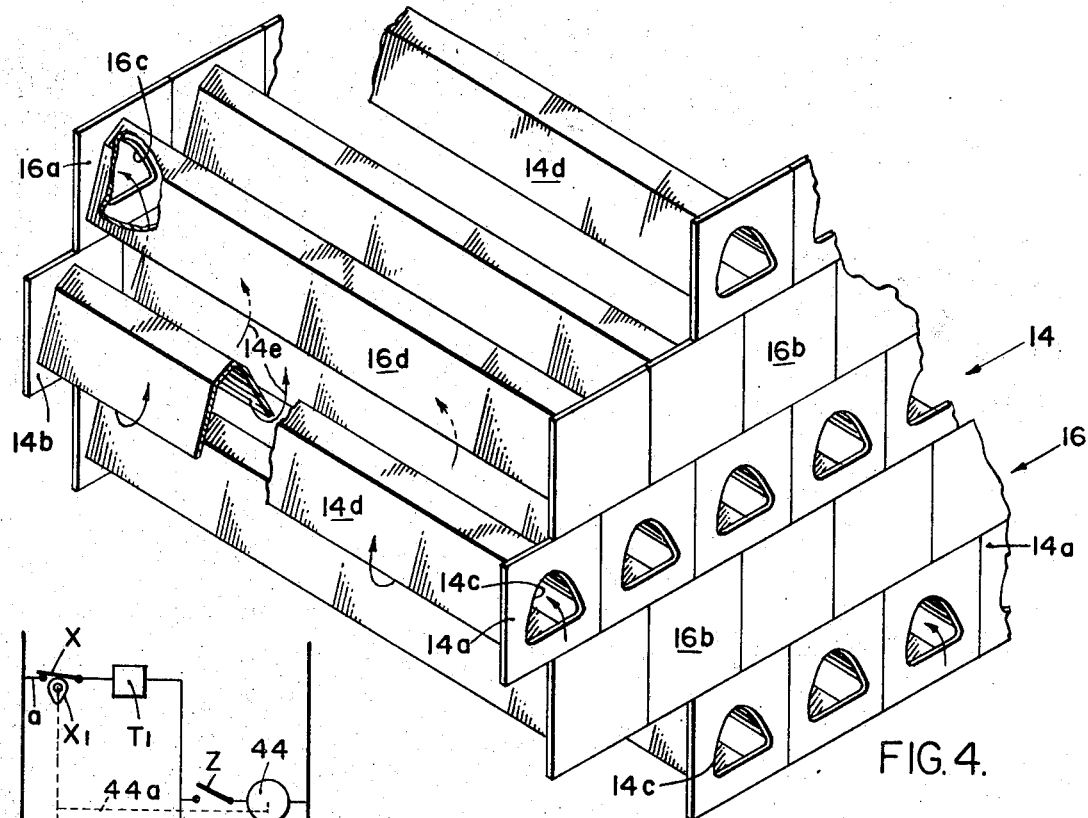
FIG. 4 is a fragmentary perspective view of the exhaust racks shown in FIG. 3, parts broken away in section.

As shown in more detail in FIGS. 3 and 4, the racks R are disposed in alternate rows 14 and 16. The intake rows 14 have end plates 14a and 14b. The plates 14b are closed, but the plates 14a are provided with inlet openings 14c, communicating with air from sources A or B, as shown in FIG. 2. Extending between end plates 14a and 14b are generally inverted V-shaped baffles 16d.

The exhaust racks R which are in rows 16 are spaced between the levels 14. Each of the exhaust racks R in rows 16 have end plates 16a and 16b. The plates 16b are closed, but the plates 16a have outlet openings 16c in communicating relation with the vapor duct V. A baffle 16d, similar to baffle 14d, extends between end plates 16a and 16b. As is apparent from the drawing, inlet ducts 14c and outlet ducts 16a are positioned on opposite sides of tower T and are vertically staggered in their alternate vertical rows 14 and 16, respectively.

The flow of air through the racks R is shown generally by the arrows in FIG. 4 as entering the undersides of baffles 14d through inlet ducts 14c, passing around the bottom edges of baffle 14d, as shown by the arrows 14e, entering the undersides of baffles 16d, and then exiting through outlet 16c.

As the air passes through the grain flowing past baffles 14d and 16d, the drying air accumulates moisture from the grain which becomes progressively drier as it proceeds downwardly through the drying tower. A conveyor 18 may be suitably provided at the bottom of discharge hopper 12 to aid in removal of the dried grain. In flowing through the grain, the air entrains dust, dirt, fines and other foreign matter in the grain.

As the drying air leaves the outlet ports 16c of the drying tower T, it enters vapor duct V which extends substantially the height of the drying tower and includes a hollow vertically extending columnar frame, shown generally at 20, having a hopper 22' connected to its lower end and an open front wall 24a. When the exhausted drying air enters the vapor duct V, accumulated foreign matter, too heavy to be carried by the air, normally drops into the hopper 22' which can be manually cleaned when necessary.

After leaving vapor duct V, the drying air passes through filter means F which covers the opening 26a in the front wall of the vapor duct. Filter means F generally includes a pair of spaced apart filter columns, shown generally at 22, extending substantially the length of vapor duct V, each column 22 having an upper inlet opening 24 and a bottom outlet, shown generally at 26. Delivery mechanism of suitable design connects with the columns 22 to provide a source of filter media M, preferably freely flowable material, to the inlet opening 24. The filter media M may be provided from a garner bin 26b and chutes 26c, as shown, fed by a bucket elevator diagrammatically illustrated at 25b. Filter media M could also be supplied directly via tubes from garner bin 10 so that the filtering material is grain of the type being dried in tower T. A discharge hopper 27 communicates with each outlet 26.

Referring now more particularly to FIGS. 2 and 5, the filter columns 22, as shown, each include a perforated outer wall 28 and diversion means for diverting the flow of air comprising a louver wall or curtain, shown generally at 29. Each louver curtain 29 extends upwardly the full height of the drying tower and includes spaced apart end columns 30, as shown in FIG. 5 of the drawings, and a plurality of vertically disposed spaced apart partitioning supports 31 located therebetween, the front edges of supports 31 being turned as at 32 for bearing and reinforcing purposes. A plurality of horizontally disposed louver members 33 span the supports 31 and are provided with slots 34 to accommodate the portions 31 which have slots 31a. These horizontally disposed louvers or panels 33 are downwardly inclined, as shown, so that the media is always directed downwardly. The inner horizontal edge of each louver 33 is bent as at 36 to provide less inclined sections 37. Because of the manner of support of louvers 33 they may be readily removed for cleaning and to permit quick and easy access to screen 28.

Figure 7:
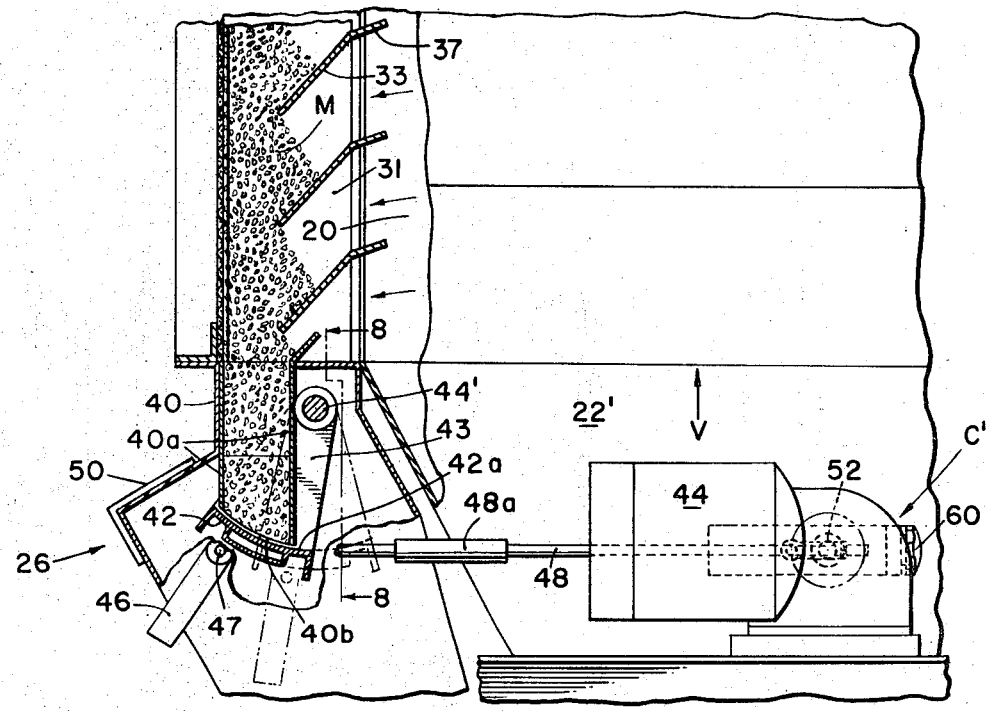
FIG. 7 is an enlarged, fragmentary, sectional view with the gates shown in closed position.
Figure 8:
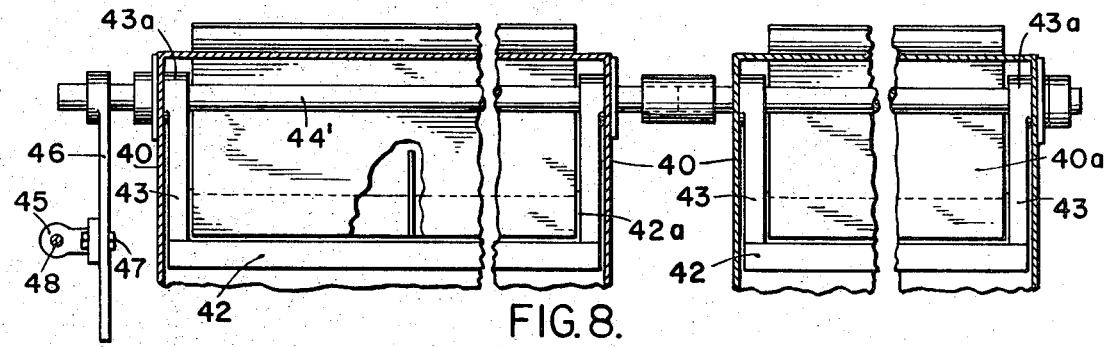
FIG. 8 is a sectional plan view, taken on the line 8—8 of FIG. 7.

Referring now to FIGS. 7 and 8 of the drawings, a valve housing 40 is shown connected to the lower end of each column 22 and serves to direct polluted media M to the discharge hopper 27. Fastened to each housing 40 and to the bottom of each column 22 in any suitable manner such as by welding, is a discharge chute 40a. A gate valve 42 for each chute 40a fixed on a shaft 44' by means of side plates 43 and collars 43a, has a curvilinear surface 42a with a curvature corresponding to the curvature 40b of the lower end of each chute 40a. The gate valve 42 is shown in the closed position in full lines in FIG. 7, the open position being indicated by phantom lines.

The mechanism for controlling the position of the valves 42 includes a motor 44 linked to gate actuator shaft 44' by an adjustable crank mechanism, shown generally at C', and a connecting rod 48. Rod 48 is connected with gate shaft 44' by a coupling 45 connected with gate lever 46 by pin 47. The bevel gearing connecting the output shaft of motor 44 with the crank mechanism 46 is provided in a gear box 52a having an output shaft 52.

Figure 10:
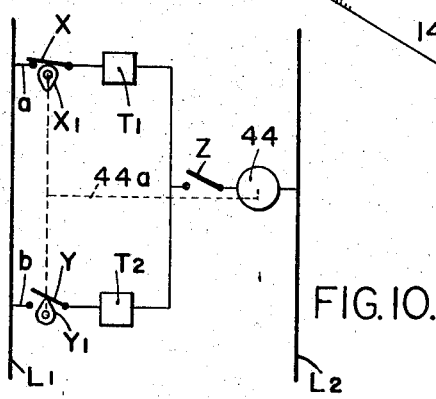
FIG. 10 is a schematic electrical system for controlling the filter media discharge gates.

Conventional motor control means may be provided so that motor 44 may be selectively turned on and off at selected intervals, for example, every fifteen seconds, to periodically move gate valves 42 to the open position shown in phantom lines. Motor control circuit means may also be provided to disconnect power to the motor for a selected period to hold the valves 42 in the open position for a variable preselected time, for example, three seconds. Such control circuit means may be suitably comprised of a timer circuit, such as shown in FIG. 10. It is to be understood that other systems may also be used, and the instant control arrangement is intended only as exemplary of one system which may be used. Motor 44 is connected across electrical input power lines $L_1$ and $L_2$ through switch Z and either lines $a$ or $b$. Line $a$ includes cam operated switch X and timer $T_1$, while included in line $b$ are cam operated switch Y and timer $T_2$. Cams $X_1$ and $Y_1$ are shown diagrammatically connected with the shaft of motor 44 and are effective to open and close switches X and Y as the shaft 44a of motor 44 turns. As main switch Z is closed, power is supplied through closed contacts of switch X to timer $T_1$. After a predetermined time, timer $T_1$ times out and power is supplied to motor 44 which operates to open valves 42 and turn cams $X_1$ and $Y_1$ which open switch X and close switch Y. When switch X opens, motor 44 stops. Closure of switch Y provides power to initiate timer $T_2$. After a second predetermined time, timer $T_2$ times out and motor 44 will again operate to close valves 42 until switch Y is open and switch X is closed, at which time the cycle will be repeated. Obviously, the predetermined times of timers $T_1$ and $T_2$ may be varied.

In the event power to motor 44 is lost, the gate valves 42 may be manually opened by removing the quick disconnect coupling 48a which connects the separate sections of connecting rod 48 and manually moving lever 46. Each valve housing 40 is also provided with inspection doors 50 which permit observation of the operation of the gate valves 42 and an inspection of the polluted media M.

Figure 9:
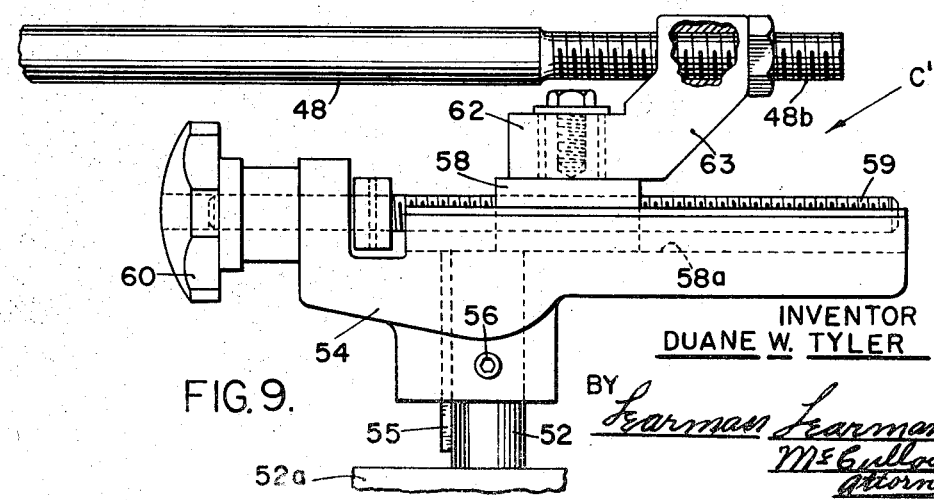
FIG. 9 is a fragmentary, part sectional plan view, showing the eccentric connection between the motor and gate.

The mechanism for varying the pulsing rate of flow of media M through each chute 40a is illustrated particularly in FIG. 9. The rate of flow will be dependent upon the distance which each gate valve 42 is displaced, which is dependent upon the adjustment of crank C'. The adjustable crank C' comprises a cradle 54 mounted rigidly on the shaft 52 by means of key 55 and set screw 56. A nut 58 is slidably mounted in a slot 58a formed in cradle 54, and block 58 may be moved in the slot by turning knob 60 to rotate screw 59 which is threadedly received by the nut 58. Rotatably mounted on nut 58 by any suitable means such as collar 62 is an arm 63 which is adapted to receive the threaded end portion 48b of connecting rod 48. By turning knob 60 to move nut 58, the degree of crank eccentricity of arm 63 relative to shaft 52 can be controlled.

Referring again to FIG. 2, after the grain leaves outlets 26 and enters discharge hopper 27, it is preferably discharged to an aspirator-separator, shown schematically at 25, where the foreign material is removed from the media by an air stream, and the air stream is sent to a centrifugal dust collector 25a. The aspirator-separator and dust collector is well known to the art and hence will not be described in detail. The cleaned media is recycled to the inlet 24 by a conventional bucket conveyor, blower, or other suitable means shown in schematic form only at 25b.

The filter media M is preferably freely flowable grain, of the type being dried. Preferably a wetter grain than the grain being dried will be used. Damp grain may be fed directly to the garner bin 10 by a bucket elevator E which is operated at a controlled rate relative to bucket elevator 25b.

As shown in FIG. 1, a splitter 19 is mounted in the chute means 26c above filtering column 22 to divert and spread the media being used, diverting it across the full width of the filtering column.

Gate valves 42 are operated so as to also maintain a pulsing column of filtering media M throughout the entire filter column 22. Relatively warm and cool air which flows through manifold systems $M_1$ and $M_2$, respectively, passes through the drying tower T from inlet openings 14c through outlet openings 16c. As the air passes through the grain column in tower T, impurities such as dust and dirt particles, bee's wings, broken bits of grain and seed, are entrained in the flow of air. Impurities which are too heavy to be carried by the flow of air fall by gravity into hopper 22' and may be disposed of. The air flow continues through filter means F which may suitably comprise a substantial column of grain. As the air enters louvers 29, the air is deflected downwardly and passes through the column of grain and then through screen 28 to atmosphere. Impurities remaining in the air stream will be deposited in the grain and also on the upper portion of each panel 33. After a predetermined time, for example, fifteen seconds, motor 44 is turned on and, through crank arm 46, gate valves 42 are opened permitting the column of grain to fall through chutes 40a. Simultaneously, clean grain is supplied at inlet 24 to maintain the filtering column. The length of time gates 42 are left open, the rate at which the gates 42 are opened and closed, and the distance which gates 42 move are all controlled to predetermine the rate at which the column of filter grain moves. As the grain approaches the bottom of column 22, it will have accumulated foreign particles during its passage through the entire length of column 22. Hence, the grain at the lower portion will be much dirtier than that at the top porion. As the grain enters hopper 27, it is passed to aspirator 25, where the impurities are removed and sent to collector 25a, while the clean grain is recycled by the bucket conveyor or the like 25b to the garner bin 26 in preparation for return to inlet 24.

It is to be understood that the drawings and descriptive matter are in all cases to be interpreted as merely illustrative of the principles of the invention rather than as limiting the same in any way since it is contemplated that various chranges may be made in the various elements to achieve like results without departing from the spirit of the invention or the scope of the appended claims.

What is claimed is:

1. A grain dryer including: a drying tower through which grain to be dried is passed; means for passing an air stream through said tower to dry said grain and entrain impurities, such as fines from the grain, in said air stream; and filter means, comprising freely flowable filtering media, for filtering said air stream to remove said impurities.

2. A grain dryer as set forth in claim 1 wherein said freely flowably filtering media comprises granular material.

3. A grain dryer as set forth in claim 2 wherein said granular material comprises a column of grain.

4. A grain dryer as set forth in claim 3 wherein said column of grain comprises wetter grain than the grain being dried.

5. A grain dryer as set forth in claim 1 further including means for selectively interrupting the flow of said freely flowable material relative to said air stream.

6. A grain dryer as set forth in claim 5 wherein said means for interrupting the flow of material includes means for varying the rate of flow of said freely flowable material.

7. A grain dryer as set forth in claim 1 wherein said filter means further includes diversion means for diverting said air stream and for supporting impurities which are filtered from said air stream.

8. A grain dryer as set forth in claim 7 wherein said filter means includes support means having slot means formed therein for receiving said diversion means, said diversion means including spaced apart louver means removably mounted in said slot means.

9. An air filter for use in a grain dryer for filtering air which is used to dry grain comprising: a filter column having an inlet and an outlet; a source of freely flowable filtering media connected with said inlet; means for selectively permitting said filtering media to flow through said column.

10. An air filter as set forth in claim 9 wherein said filter column includes: a perforated outer surface and a louver apron mounted on its inner surface; said filtering media being located adjacent said apron.

11. An air filter as set forth in claim 9 further including means for recycling said material from said outlet to said inlet.

12. An air filter as set forth in claim 9 further including means for varying the rate of flow of said filtering media.

13. An air filter as set forth in claim 12 wherein said means for selectively permitting said filtering media to flow includes: valve means for opening and closing said outlet; and said means for varying the rate of flow includes means for opening and closing said valve means after predetermined intervals.

14. A grain dryer as set forth in claim 16 wherein said movable filtering media comprises granular material.

15. A grain dryer as set forth in claim 14 wherein said granular material comprises a column of grain.

16. A grain dryer for drying grain comprising: means for passing an air stream through said grain to dry said grain and entrain impurities, such as fines from the grain, in the said air stream; and filter means, comprising a vertically pulsing filtering media and means for creating said pulsing movement, for filtering said impurities from said air stream.

17. A grain dryer as set forth in claim 16 wherein said means for creating the pulsing movement comprises means for selectively permitting said filtering media to fall of its own weight.

18. A grain dryer as set forth in claim 16 wherein said filter means further includes diversion means for diverting said air stream in the direction in which said filtering media moves relative to said air stream.

19. A grain dryer as set forth in claim 18 wherein said diversion means comprises louver means removably mounted in slots formed in transverse extending support means.

20. A method of drying grain comprising the steps of: maintining a substantial stream of vertically moving grain to be dried in a drying tower; maintaining a substantial column of freely flowable filter material adjacent said drying tower; and passing an air stream through said drying tower to dry said grain and entrain impurities from said grain in said air stream; and passing said air stream through said column of freely flowable filter material whereby the impurities are entrained by the freely flowable material.

21. A method as set forth in claim 20 further including the step of removing the impurities from the filter material.

22. A method as set forth in claim 21 further including the step of recycling the filter material from the bottom to the top of said column of filter material.

23. A method of treating grain and the like comprising: passing a gaseous stream through the grain to dry the grain and entrain impurities in the gaseous stream; passing the gaseous stream through a filter formed of a flowing stream of filtering grain to entrain the impurities therein; and discharging the gaseous stream.

24. A grain dryer including a drying tower through which grain to be dried is passed; a stationary filter screen mounted at a spaced distance from said tower, means for passing an air stream through said tower to dry said grain and entrain impurities, such as fines from the grain, in said air stream; and means for passing a filtering medium between said tower and screen to filter said air stream and remove impurities therefrom while tending to keep said filter screen clean and permit the release of relatively pure air through said filter screen to atmosphere.

25. The combination defined in claim 24 wherein air diversion means directs said air stream generally in the direction of passage of said medium.

26. The combination defined in claim 24 in which means are provided for purifying and recirculating said medium.

References Cited

UNITED STATES PATENTS

| | | | |
|---|---|---|---|
| 409,287 | 8/1889 | Immendorf | 34—168 |
| 877,942 | 2/1908 | McCarthy | 34—203 |
| 1,496,473 | 6/1924 | Little | 34—168 |
| 1,517,788 | 12/1924 | Little | 34—168 |
| 2,080,059 | 5/1937 | Peebles | 34—10 |
| 2,657,032 | 10/1953 | Tomlinson | 34—203 |
| 2,974,419 | 3/1961 | Houk | 34—10 |
| 3,300,873 | 1/1967 | Bussell | 34—168 |

WILLIAM J. WYE, Primary Examiner

U.S. Cl. X.R.

34—12, 22, 130, 203, 218